July 19, 1960 W. VLASAK 2,945,920

ELECTRONIC HYBRID

Filed Jan. 17, 1958

INVENTOR.
Weldon Vlasak
BY Mueller & Aichele
Attys.

United States Patent Office 2,945,920
Patented July 19, 1960

2,945,920

ELECTRONIC HYBRID

Weldon Vlasak, Phoenix, Ariz., assignor to Motorola, Inc., Chicago, Ill., a corporation of Illinois Filed Jan. 17, 1958, Ser. No. 709,682

7 Claims. (Cl. 179—170)

This invention relates generally to communication systems, and more particularly to an electronic hybrid circuit for use in coupling a transmitter and a receiver to a two-wire telephone line for providing two-way communications.

In conventional telephone systems, intelligence signals are transmitted from one telephone unit to another over telephone wire transmission lines. Intelligence signals derived from the mouthpiece unit of the telephone must be supplied primarily to the line, while "talkback" intelligence signals received over the line should be supplied primarily to the earpiece unit of the telephone. So-called hybrid circuits are used to accomplish this directional transfer of signals. It is sometimes desirable to use telephone type service in radio communication systems, and in such systems there is a similar need for hybrid circuits for coupling the radio transmitter and receiver to a telephone line connected to a switchboard, to provide directional transfer of signals.

Various types of hybrids have been proposed for such applications, and it has been found that hybrids of the electronic amplifying type can be used advantageously where it is desirable to provide power gain. The electronic hybrid should, however, have good transfer efficiency in all directions in which energy is transferred, should maintain satisfactory balance with changes in line impedance, and should be economical to manufacture and service. Known electronic hybrids have not been entirely satisfactory in one or more of these respects.

Accordingly, it is an object of this invention to provide a new and improved electronic hybrid for use in communication systems having a transmitter and receiver coupled to a telephone wire line.

Another object of the invention is to provide a simple electronic hybrid circuit which is economical to manufacture and provides reliable service.

Still another object of the invention is to provide an improved electronic hybrid circuit having comparatively high transfer efficiency and good balance characteristics.

A feature of the invention is the provision of an electronic hybrid for connecting a signal input circuit and a signal output circuit to a transmission line, and having a first electron valve for selectively transferring signals from the signal input circuit to the line for transmission in a forward direction over the line, and having a second electron valve for selectively transferring signals received in the reverse direction over the transmission line to the signal output circuit.

A further feature of the invention is the provision of an electronic hybrid including a first electron valve connected as cathode follower with a signal input connected to a control electrode and a transmission line connected to a charge emitting electrode thereof for transferring signals from the signal input to the line with power gain, and the line also being coupled to the charge emitting electrode of a second electron valve having a signal output connected to an output electrode thereof for transferring energy received over the line to the signal output with power gain.

A still further feature of the invention is the provision of an electronic hybrid including first and second electron valves coupled in parallel to a line transformer with the first valve having a signal input and the second valve having a signal output, and having a frequency compensated voltage divider circuit deriving a control voltage from the signal input and applying it to a control electrode in the second valve for preventing translation by the same when intelligence signals are supplied to the signal input for transfer to the line but not when "talkback" intelligence signals are supplied to the line terminals for transfer to the signal output.

A still further feature of the invention is the provision of an electronic hybrid in accordance with the preceding paragraph in which the first electron valve is connected as a cathode follower having voltage controlled negative feedback which maintains comparatively stable balance conditions despite changes in line impedance.

The invention is illustrated in the drawings in which.

Briefly stated, the invention provides a new and improved electronic hybrid circuit for use in communication systems in which intelligence signals are transmitted over a telephone transmission line both to and from a central station. The electronic hybrid provides directional transfer of energy from a signal input (which may be a telephone mouthpiece unit or a radio receiver) to the transmission line and from the transmission line to a signal output (which may be a telephone earpiece unit or a radio transmitter), with good transfer efficiency and stable balance characteristics. In a preferred embodiment of the invention this is accomplished by providing two electron valves with the first one having its grid coupled to a signal input and the second one having its anode coupled to a signal output, and with the cathode electrodes of the valves being connected in parallel to the line. A frequency compensated voltage divider is connected from the signal input to a grid in the second valve. The first valve operates as a cathode follower when intelligence signals are applied to the signal input, whereas the second valve is not responsive since the voltage divider applies to the grid thereof a signal which balances out the signal appearing on the common cathodes. Thus, signals are transferred to the line by the first valve with power gain, but these signals are not translated by the second valve and therefore are not supplied to the signal output. On the other hand, when "talkback" signals are being received over the line, the first valve and the voltage divider are not responsive, whereas such signals are transferred by the second valve to the signal output with power gain. The voltage appearing on the cathode of the second valve is maintained at a relatively constant level despite changes in line impedance due to negative feedback action in the first valve which operates as a cathode follower, thus helping to maintain stable balance conditions.

Figure 1:
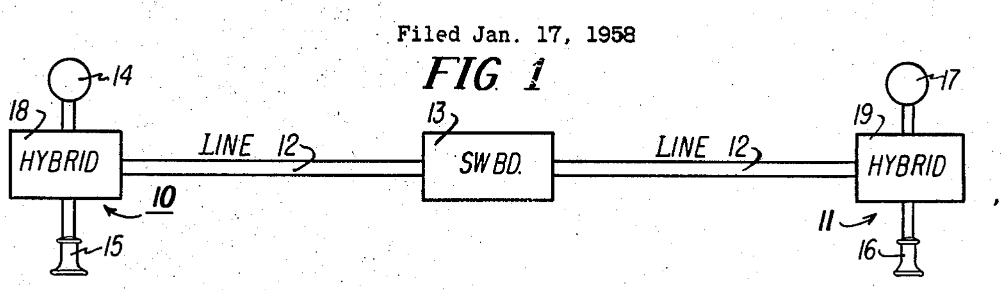
Fig. 1 is a block diagram showing a telephone communication system having hybrid devices therein.

In Fig. 1 there is shown a block diagram representing a simple telephone communication system in which one telephone substation 10 is connected to another telephone substation 11 by a two-wire telephone line 12 which is interconnected through switchboard 13. When a caller speaks into the mouthpiece-transmitter 14, it is desirable that his voice be heard by the person called through the earpiece-receiver 16 and not by the caller himself through the earpiece-receiver 15. Similarly, when the person called talks back through the mouthpiece-transmitter 17, he should be heard by the caller through the earpiece-receiver 15 and not by himself through the earpiece-receiver 16. Therefore, so-called hybrid devices 18 and 19 are provided respectively in the telephone units 10 and 11 to accomplish the required directional transfer of signals.

Transformer-type hybrid devices have been used rather commonly in telephone communication systems such as that illustrated in Fig. 1. Such hybrids have not been entirely satisfactory, and in particular are inadequate in applications such as illustrated in the block diagram shown in Fig. 2. In this system a radio central 20 is connected to another radio central 21 by telephone wire lines 22 which are interconnected through a switchboard 23. A radio receiver-transmitter 24, which may be a mobile unit, sends and receives intelligence signals to and from radio central 20 over channel A, and another such receiver-transmitter unit 25 sends and receives intelligence signals to and from radio central 21 over channel B. When an audio intelligence signal is transmitted over channel A to the radio receiver 27, the hybrid 31 ensures that the signal is transferred primarily to the line 22 and not to the radio transmitter 28 in substantial amounts. This substantially prevents retransmission of the intelligence signal over channel A which is desirable in the system shown. The intelligence signal may be conducted through the line 22 and switchboard 23 to the hybrid 32 which transfers energy to the radio transmitter 30 for transmission over channel B to the receiver-transmitter 25. When the station called talks back, an audio intelligence signal is received over channel B by the radio receiver 29 and is transferred through the hybrid 32, line 22, switchboard 23, and hybrid 31 to the transmitter 28 for transmission over channel A to the receiver-transmitter 24.

Figure 2:
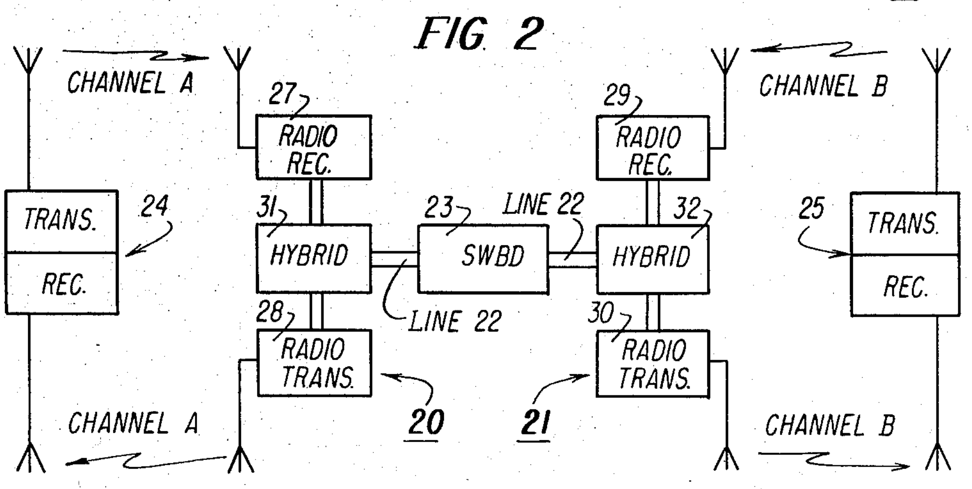
Fig. 2 is a block diagram showing a radio communication system having hybrid devices therein.
Figure 3:
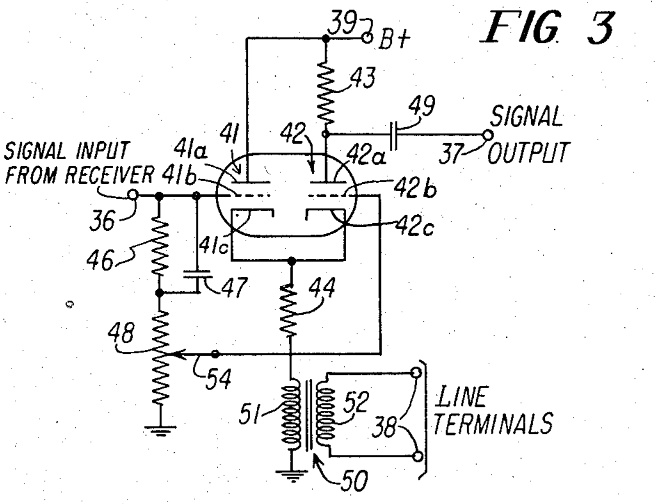
Fig. 3 is a circuit diagram showing the electronic hybrid in accordance with the invention.

In Fig. 3 there is shown the circuit for a hybrid device in accordance with the invention which can be used advantageously in communication systems such as those shown in Fig. 1 and Fig. 2. The hybrid includes two triodes 41 and 42 respectively having electrodes 41*a*, 41*b*, 41*c* and 42*a*, 42*b*, 42*c*. The control electrode or grid 41*b* of triode 41 is connected to the signal input terminal 36, the charge collecting electrode or anode 42*a* of triode 42 is connected to a signal output terminal 37, and the charge emitting electrodes or cathodes 41*c* and 42*c* are connected in common and through a resistor 44 to the primary winding 51 of a transformer 50 whose secondary winding 52 is connected to line terminals 38. B+ potential for biasing the triodes is supplied from the terminal 39 directly to the anode 41*a* and through the bias resistor 43 to the anode 42*a*. A blocking capacitor 49 is provided in the line leading to the signal output terminal 37 to isolate the same from the D.C. biasing current. A resistor 46 and a potentiometer 48 are series connected between the control electrode 41*b* and ground, and the slider 54 of the potentiometer 48 is connected to the control electrode 42*b* of the triode 42.

The triode 41 functions as a cathode follower, and audio intelligence signals applied to the input terminal 36 with ground as a reference cause current flow through the triode providing a voltage at the cathode 41*c* thereof. The voltage appearing across the primary winding 51 is coupled to the line by the transformer 50. The transformer has approximately a one-to-one winding ratio but the cathode follower provides current amplification so that substantial power gain is achieved. Thus, the triode 41 operating as a cathode follower transfer signals from the signal input to the line with a gain in power.

As previously pointed out, however, it is desirable that in this mode of operation substantial energy should not be transferred to the signal output 37. This is accomplished by a compensating circuit which consists of the resistor 46, the phase-shifting capacitor 47 and the potentiometer 48 connected as a frequency compensated voltage divider. When an intelligence signal is applied to the signal input terminal 36, a voltage is developed across the resistors 46 and 48. A portion of this voltage is applied by the potentiometer slider 54 to the control electrode 42*b* of the triode 42. The amplitude of the control voltage on the grid 42*b* is adjusted so that it has the same amplitude and phase as that appearing on the cathode 42*c*. Thus the triode 42 is unresponsive, and the signal is substantially not translated thereby. In order to achieve this condition, called the balance condition herein, the transfer function of the compensating circuit must be the same as the transfer characteristic of the cathode follower circuit. The voltage appearing on the cathode 42*c* has a frequency response characteristic which must be duplicated by the compensating circuit in order to prevent cross-talk interference. Resistor 46 and capacitor 47 have values which produce a time constant equal to the time constant produced by the cathode circuit inductance and resistance. Resistor 48 and capacitor 47 have values which produce a time constant equal to the time constant produced by the cathode circuit inductance and the transconductance of the triode 41.

When talk-back signals are applied to the line terminals 38, the triode 42 is driven in a grounded grid mode and translates such signals to the signal output terminal 37 with substantial power gain. Since the anode 41*a* of triode 41 is connected directly to the B+ terminal 39, no output is derived therefrom. The control electrode 41*b* of triode 41 is also grounded so that, except for the negligible effect of interelectrode capacitance, talk-back signals are not translated to the signal input terminal 36.

It has been found that the ratio between energy transferred to the line and the energy transferred to the signal output, called the null ratio, is maintained relatively constant despite changes in line impedance. This is a particularly important feature when the signal output is connected to a radio transmitter such as the transmitter 28 shown in Fig. 2 where it is desirable to keep retransmitted energy at a minimum. The stability of the null ratio can be attributed to the use of a cathode follower, which is a degenerative amplifier with low output impedance, for transferring energy to the transmission line. Assuming that optimum balance conditions are obtained for a given line impedance, variation in the amplitude of the voltage appearing on the cathode 42*c* is not directly proportional to changes in load impedance. This is because the source voltage is the sum of that developed across the load and that developed from grid 41*b* to cathode 41*c*. As the load impedance decreases, negative feedback increases the grid-to-cathode voltage causing an increase in current which tends to compensate for the decreased impedance by increasing the voltage across the load somewhat. Accordingly, although the control voltage on the grid 42*b* remains constant with changes in line impedance, variations in the voltage on the cathode 42*c* are comparatively small due to the degeneration and the null ratio is maintained more nearly constant.

For some applications where the line impedance does not vary over a wide range, it may be desirable to bypass the resistor 44 with a capacitor and to adjust the values of the elements in the compensating circuit correspondingly. In this case the voltage supplied to the cathode 42*c* is substantially the same as the voltage applied to the transformer 50 and therefore imperfections in the balance are less critical. In applications where line impedance variations are substantial, the resistor 44 is important because it increases the total load impedance to reduce variations in the output voltage of the cathode follower resulting from line impedance variations. This combined with the degeneration action produces a very stable balance condition.

The electronic hybrid of the invention may be used in any communication system having a telephone wire line in any part of the system. For instance, the system may include a broadcast frequency link or a microwave frequency link in addition to the telephone wire. The hybrid provides efficient energy transfer with power gain in all directions in which energy is to be transferred, and an effective balanced condition is maintained despite changes in line impedance. The circuit is quite simple and employs relatively inexpensive components, and therefore it can be economically manufactured. The circuit is not critical and a minimum of servicing and maintenance is required.

I claim:

1. An electronic hybrid for providing directional transfer of energy between first, second, and third terminal means, said hybrid including in combination, cathode follower amplifier circuit means including a first electron valve, said cathode follower circuit means including an input circuit portion connected to said first terminal means and an output circuit portion connected to said second terminal means, grounded grid amplifier circuit means including a second electron valve, said grounded grid circuit means including an input circuit portion connected to said output circuit portion of said cathode follower circuit means and to said second terminal means and having an output circuit portion connected to said third terminal means, and compensating circuit means energized by the signal at said first terminal means and applying a control voltage to said second electron valve for preventing translation by the same, thereby substantially preventing transfer of energy to said third terminal means while energy is being transferred to said second terminal means.

2. An electronic hybrid for connecting a signal input unit and a signal output unit to a wire transmission line, said hybrid including signal input terminal means, signal output terminal means, line terminal means, cathode following circuit means including a first electron valve having a control electrode coupled to said signal input terminal means, amplifier circuit means including a second electron valve having a control electrode and having a charge collecting electrode coupled to said signal output terminal means, said first and second electron valves having charge emitting electrodes connected in common and coupled to said line terminal means, and compensating circuit means comprising a frequency compensated voltage divider connected to said signal input terminal means and to said control electrode of said second electron valve for substantially preventing translation by said second electron valve in response to the application of an intelligence signal to said signal input terminal means.

3. An electronic hybrid for connecting a signal input unit and a signal output unit to a two-wire transmission line, said hybrid including in combination, cathode follower circuit means including a first electron valve having a control electrode for connection to the signal input unit, amplifier circuit means including a second electron valve having a control electrode and having a charge collecting electrode for connection to the signal output unit, said first and second electron valves having charge emitting electrodes coupled together and to the transmission line, said cathode follower circuit means being operative to translate a signal received from the signal input unit and to apply an amplified signal to the line for transmission thereon, said amplifier circuit means being operative to translate a signal received from the line and to supply an amplified signal to the signal output unit, and compensating circuit means for connection to said signal input unit and connected to said control electrode of said second electron valve for applying thereto a signal for balancing the signal applied to the charge emitting electrode thereof by said cathode follower circuit means so that said signal from said signal input unit is not transmitted to said signal output unit.

4. An electronic hybrid for connecting a signal input unit and a signal output unit to a two-wire transmission line, said hybrid including in combination, a first electron valve having a charge collecting electrode and having a control electrode for connection to the signal input unit, a second electron valve having a control electrode and having a charge collecting electrode for connection to the signal output unit, said first and second electron valves having charge emitting electrodes connected in common, transformer means coupled to said common charge emitting electrodes and to the transmission line, means including resistor means for applying biasing potential to said charge collecting electrodes, and compensating circuit means for connecting said control electrode of said second electron valve to said signal input unit, said first electron valve being operative to translate a signal received from the signal input unit and to supply an amplified signal to said transformer means, said second electron valve being operative to translate a signal received from the line and to supply an amplified signal to the signal output unit, and said compensating circuit means being operative to derive a control voltage from said signal received from the signal input unit and to apply such control voltage to said control electrode of said second electron valve for substantially preventing translation by said second electron valve of the signal supplied to the charge emitting electrode thereof by said first electron valve.

5. An electronic hybrid for connecting a signal input unit and a signal output unit to a two-wire transmission line, said hybrid including in combination, signal input terminal means, signal output terminal means, line terminal means, cathode follower circuit means including a first electron valve having a charge collecting electrode and having a control electrode connected to said signal input terminal means, amplifier circuit means including a second electron valve having a control electrode and having a charge collecting electrode connected to said signal output terminal means, said first and second electron valves having charge emitting electrodes connected in common, first resistor means connected to said common charge emitting electrodes for biasing the same, transformer means having a first winding connecting said resistor means to a point of reference potential and having a secondary winding connected to said line terminal means, means including second resistor means for applying biasing potential to said charge collecting electrodes, and compensating circuit means including third resistor means connected to said signal input terminal means, potentiometer means having a resistive element connecting said third resistor means to a point of reference potential and having a slider connected to said control electrode of said second electron valve, and capacitor means connected across said third resistor means, said cathode follower circuit means being operative to translate a signal received from the signal input unit and to apply an amplified signal to said transformer means for transmission over the line, said amplifier circuit means being operative to translate a signal received from the line and to apply an amplified signal to said signal output terminal means, and said compensating circuit means being operative to derive a control voltage from said signal received from the signal input unit and to apply such control voltage to said control electrode of said second electron valve for substantially preventing translation by said second electron valve of the signal supplied to the charge emitting electrode thereof by said first electron valve.

6. An electronic hybrid for connecting a signal input unit and a signal output unit to a wire transmission line for providing directional transfer of energy therebetween, said hybrid including in combination, first amplifier circuit means for translating a signal applied thereto from the input unit and applying an amplified signal to the transmission line, said first amplifier circuit means including a first amplifying electron device having an input electrode for receiving the signal from the input unit and a charge emitting output electrode, coupling circuit means having low impedance connecting said charge emitting output electrode to the transmission line, said coupling circuit means providing degenerative action and developing an output voltage thereacross which follows the voltage produced at said input electrode by the signal applied thereto, second amplifier circuit means including a second amplifying electron device for translating a signal from the transmission line and applying an amplified signal to the signal output unit, said second electron device having a charge emitting input electrode and having an output circuit portion for applying the signal amplified thereby to the signal output unit, means connecting said charge emitting input electrode of said second electron device to said charge emitting output electrode of said first electron device and to said coupling circuit means, whereby an amplified signal supplied to the transmission line from said first electron device is also supplied to said input electrode of said second electron device and the signal from the transmission line is applied to said input electrode of said second electron device, and balancing circuit means energized by the signal from the signal input unit and applying a signal to said second electron device counteracting the signal supplied thereto from said first electron device, thereby establishing a balanced condition wherein substantially no energy is transferred from the signal input unit to the signal output unit, with the degenerative action of said first amplifier circuit means stabilizing the balanced condition.

7. An electronic hybrid for connecting a signal input unit and a signal output unit to a balanced wire line and for providing directional transfer of energy therebetween, said hybrid including in combination, first amplifier circuit means including a first electron device for translating a signal from the input unit and applying an amplified signal to the transmission line, said first electron device having an input electrode and a charge emitting output electrode, said first amplifier circuit means having an input circuit portion coupled to said input electrode for receiving the signal from the input unit and having a low impedance output circuit portion coupled to said output electrode and providing degeneration in said first amplifier circuit means, second amplifier circuit means including a second electron device for translating a signal from the transmission line and applying an amplified signal to the signal output unit, said second electron device having an input electrode coupled to said output circuit portion of said first amplifier circuit means and having an output electrode for applying the signal amplified thereby to the signal output unit, means for coupling the transmission line to said first and second amplifier circuit means including a transformer having a portion providing balanced coupling to the line and a portion providing unbalanced coupling to said first and second amplifier circuit means, said output circuit portion of said first amplifier circuit means including a resistive element connected in series with the portion of said transformer means providing unbalanced coupling and connected to said output electrode of said first electron device and to said input electrode of said second electron device, whereby an amplified signal supplied to the transmission line from said first amplifier circuit means is also supplied to said input electrode of said second electron device of said second amplifier circuit means and the level of such signal is relatively independent of variations in the impedance of the line, and balancing circuit means energized by the signal from the signal input unit and applying a signal to said second electron device counteracting the signal supplied thereto from said first amplifier circuit means, thereby establishing a balanced condition wherein substantially no energy is transferred from the signal input unit to the signal output unit, with the degenerative action of said first amplifier circuit means stabilizing the balanced condition.

References Cited in the file of this patent

UNITED STATES PATENTS 2,511,948 Wang ---------------- June 20, 1950

OTHER REFERENCES

Electronic and Radio Engineering, Terman, McGraw-Hill Book Co., Inc., 1955, pages 392–395 relied on.